(12) United States Patent
Martin

(10) Patent No.: US 7,414,771 B2
(45) Date of Patent: Aug. 19, 2008

(54) ADHESIVE ION-CONDUCTING LAYER FOR FLEXIBLE ELECTROCHROMIC DEVICES

(75) Inventor: Paul J. Martin, Gloucester City, NJ (US)

(73) Assignee: Chameleon Optics, Inc., Philadelphia, PA (US)

(*) Notice: Subject to any disclaimer, the term of this patent is extended or adjusted under 35 U.S.C. 154(b) by 70 days.

(21) Appl. No.: 11/462,101

(22) Filed: Aug. 3, 2006

(65) Prior Publication Data
US 2008/0030834 A1 Feb. 7, 2008

(51) Int. Cl.
  G02F 1/15 (2006.01)
  G02F 1/153 (2006.01)
  A61B 5/04 (2006.01)

(52) U.S. Cl. .................. 359/265; 359/273; 359/275; 600/391; 428/432; 428/442

(58) Field of Classification Search ......... 359/265–275, 359/245, 591; 345/105–107; 428/426, 522, 428/702, 193, 332, 457, 432, 442; 429/44, 429/305, 309, 310, 316; 604/20; 264/104, 264/105; 600/391, 396, 459; 524/377; 514/329, 514/946, 947; 424/449
See application file for complete search history.

(56) References Cited

U.S. PATENT DOCUMENTS

| | | | |
|---|---|---|---|
| 4,226,247 A * | 10/1980 | Hauser et al. ............... 600/391 |
| 4,848,353 A * | 7/1989 | Engel .......................... 600/391 |
| 4,855,161 A | 8/1989 | Moser et al. |
| 4,860,754 A * | 8/1989 | Sharik et al. ................. 600/391 |
| 4,893,908 A * | 1/1990 | Wolf et al. ................... 359/275 |
| 5,003,978 A * | 4/1991 | Dunseath, Jr. ............... 600/391 |
| 5,042,923 A * | 8/1991 | Wolf et al. ................... 359/275 |
| 5,296,318 A | 3/1994 | Gozdz et al. |
| 5,337,184 A | 8/1994 | Helms et al. |
| 5,470,673 A | 11/1995 | Tseung et al. |
| 5,598,293 A | 1/1997 | Green |
| 5,825,526 A * | 10/1998 | Bommarito et al. .......... 359/265 |
| 5,910,854 A * | 6/1999 | Varaprasad et al. .......... 359/273 |
| 5,953,150 A * | 9/1999 | Smarto et al. ................. 359/265 |
| 5,969,847 A * | 10/1999 | Coleman et al. ............. 359/265 |
| 5,990,179 A * | 11/1999 | Gyory et al. ................. 514/329 |
| 6,087,426 A * | 7/2000 | Helms et al. ................. 524/377 |
| 6,361,709 B1 | 3/2002 | Bauer et al. |
| 6,456,418 B1 | 9/2002 | Martin et al. |
| 6,645,675 B1 | 11/2003 | Munshi |
| 6,828,065 B2 | 12/2004 | Munshi |
| 6,995,891 B2 | 2/2006 | Agrawal et al. |

* cited by examiner

*Primary Examiner*—Loha Ben
(74) *Attorney, Agent, or Firm*—Duane Morris LLP

(57) ABSTRACT

A flexible electrochromic device is disclosed, the device including a flexible substrate with at least one electrically conductive surface, and an adhesive ion-conducting layer including a) a polymer binder selected from the group of polyvinylpyrrolidone and copolymers of vinylpyrrolidone, and b) a source of mobile cations, e.g., alkali metal salts, acids, polyelectrolytes and polyacids, wherein the device is capable of being deformed and returned to "flatness" in an undamaged state.

14 Claims, 3 Drawing Sheets

ADHESIVE ION-CONDUCTING LAYER FOR FLEXIBLE ELECTROCHROMIC DEVICES

FIELD OF THE INVENTION

The present invention relates to the production of flexible electrochromic devices using electrically conductive flexible substrates and common manufacturing techniques.

BACKGROUND OF THE INVENTION

An electrochromic material undergoes a reversible color change upon the adsorption and desorption of small cations. This property can be exploited to fabricate a device that changes color upon the application of a voltage potential.

The typical electrochromic device comprises an electrochromic layer and an ion-storage layer sandwiched between two electrically conductive substrates, at least one of which is transparent. Optionally, the electrochromic layer and the ion-storage layer can be separated by an ion-conducting layer. The ion-storage layer can optionally be replaced by the ion-conducting layer. Optical properties of the electrochromic device change when ions (e.g., hydrogen ions or lithium ions) intercalated within the structure of the ion-storage layer are removed and interposed with the structure of the electrochromic material in response to an electric potential applied to the electrically conductive substrates. Ions are removed and returned to the ion-storage layer by reversing the polarity of the applied potential, thereby returning the electrochromic device to its original optical state.

The electrochromic layer and the ion-storage layer are similar in that they both adsorb and desorb mobile ions in response to an applied electric field. A simple model for understanding electrochromic devices assumes that the electrochromic layer colors and clears during ion adsorption/desorption, while the ion-conducting layer and ion-storage layer remain transparent. However, practical electrochromic devices can be made if the ion-storage layer colors as well. For example, if the electrochromic layer cycles from clear to color upon ion adsorption (e.g. tungsten oxide), and the ion-storage layer cycles from clear to color upon ion desorption (e.g. nickel oxide), the overall devices will cycle from clear to color. If the electrochromic layer cycles from clear to blue upon ion adsorption (e.g. tungsten oxide), and the ion-storage layer cycles from clear to yellow upon ion adsorption (e.g. vanadium oxide), the overall device will cycle from blue to yellow. Numerous combinations are possible.

Furthermore, if the ion-conducting layer is opaque and the electrochromic layer cycles from clear to blue, the entire device will cycle from blue to the color of the ion-conducting electrolyte layer, regardless of the coloration of the ion-storage layer.

The construction of an electrochromic device typically involves coating electrochromic material onto a transparent, conductive substrate. If the transparent, electrically conductive substrate comprises glass, there are several proven coating methods available. These include evaporation deposition (U.S. Pat. No. 5,598,293) and electro-deposition (U.S. Pat. No. 5,470,673). Of particular advantage and commercially available utility is the coating of a transition metal oxide from an alcoholic solution (U.S. Pat. No. 4,855,161), followed by heating in excess of 200° C. Electrochromic devices produced on rigid glass substrates are handled and assembled individually.

An electrochromic device comprising flexible plastic substrates would have advantages over electrochromic devices comprising glass substrates. These advantages include light weight, durability, shapability, low cost and ease of manufacture. It is particularly desirable that flexible electrochromic devices could be manufactured at high speed on conventional coating/lamination equipment in large rolls, and cut to fit as needed. In order to achieve this goal, however, it is necessary for either the electrochromic layer, the ion-conducting layer, or the ion-storage layer to act as an adhesive for reliable assembly. The present invention focuses on the ion-conducting layer to play this role as an adhesive.

Typically, the adhesive properties of polymers that are known as good adhesives, such as polyalkylacrylates or polyvinylbutyral, deteriorate rapidly when plasticizer and salt are added to make them ion conducting. The ionic conductivity of polymers that are known good ionic conductors, such as perfluorosulfonated anionic polyelectrolyte, deteriorates when they are blended with polymers to make them adhesive. Another approach is to coat an ion-conducting layer containing monomers and/or oligomers and curing these species as a post-processing step to achieve adhesion. However, this involves a complex extra manufacturing step, and it runs the risk of embrittling the flexible device.

There has been extensive effort to provide an ion-conducting layer for lithium batteries, a field that shares common chemistry with electrochromic devices. Many of these low molecular weight polymers have a relatively low dielectric constant when compared to their liquid solvent counterpart, and thus limit the number of charge carriers in the plasticized polymer (U.S. Pat. No. 6,645,675). In an effort to overcome this hindrance, high dielectric constant liquid organic solvents such as ethylene carbonate (EC) and propylene carbonate (PC) have been incorporated in the host polymer, both to increase the number of charge carriers and further increase the room temperature conductivity of the polymer (U.S. Pat. No. 6,828,065). The use of these organic solvents to plasticize polymers such as polyvinylacetal, polyacrylonitrile, polyvinylacetate and hexafluoropropenevinylidene fluoride copolymer is known. However, the mechanical properties of these polymers were so inadequate that they had to be supported on porous matrices. Polyvinylidene fluoride (PVDF) and polyacrylonitrile (PAN) were previously evaluated and have also been doped with a variety of liquid polar solvents, yielding room temperature conductivities as high as $10^{-3}$ S/cm. Subsequently, PVDF has been the subject of further study (U.S. Pat. No. 5,296,318). However, these materials were developed for batteries and are not good adhesives for flexible electrochromic devices.

EP 1056097 describes polyacrylate, polystyrene, polyvinylbutyral, polyurethane, polyvinylacetate, polyvinylchloride and polycarbonate as suitable polymer binders for the ion-conducting layer in rigid electrochromic devices. U.S. Pat. No. 6,995,891 cites these same polymeric binders. Nevertheless, with these binders, adhesion is achieved by laminating the devices individually after putting a bead of non-ion-conducting polyvinylbutyral around the device perimeter. As an example for this class, Example 1 illustrates that a polyacrylate binder formulated for ionic conductivity does not function well as an adhesive in an electrochromic device.

U.S. Pat. No. 5,337,184 describes curing the solid electrolyte in place utilizing a polymeric adduct having an acrylic backbone and polyether side chains made by reacting a hydroxyl-functional acrylic co-polymer and a polyether-monoisocyanate. However, this is a complex, extra manufacturing step, with a resulting solid electrolyte that may be too rigid for a flexible device.

Glass electrochromic devices have not achieved broad commercial acceptance in architectural, automotive or eyewear applications, due to practical limitations. First, glass electrochromic devices can be prohibitively expensive to manufacture. Second, glass electrochromic devices cannot function over the decades required for architectural and automotive applications; with each cycle, an electrochromic device suffers a minute but cumulative deterioration in performance, due to the accumulation of an irreversible colored "bronze" and trapped gas. Third, glass electrochromic devices are too heavy for eyewear applications and can also shatter to dangerous shards upon impact of a foreign object.

Plastic electrochromic devices address these limitations. Manufacturing costs are controlled by low capital requirements and high throughput. For example, in accordance with the present invention, an electrochromic layer, an ion-conducting layer, and an ion-storage layer could be coated at a rapid rate on a continuous wide web of electrically conductive polyethylene terephthalate film. The flexible electrochromic device could then be laminated together using the adhesive ion-conducting layer described herein. If this laminated film is applied to architectural and automotive glazing, the film could be replaced if its performance deteriorates over time. If the laminated film is applied to polycarbonate, or if the electrochromic device included polycarbonate coated directly, the electrochromic device would be light and safe enough for eyewear.

SUMMARY OF THE INVENTION

The present invention provides a composition of an ion-conducting layer which coats uniformly onto flexible substrates which require low processing temperatures. This ion-conducting layer is flexible, optically clear and an excellent adhesive. The composition comprises (1) a binder selected from the group of polyvinylpyrrolidone or copolymers of vinylpyrrolidone and (2) a source of mobile cations. Optionally, the composition can be modified by the addition of other compatible polymers, plasticizers, pigments or fillers.

The present invention further provides the means to fabricate electrochromic devices with the advantages of light weight, low cost, durability and flexibility.

DETAILED DESCRIPTION OF THE INVENTION

The present invention provides a composition of an adhesive, clear, ion-conducting layer which casts uniformly onto electrically conductive, flexible, plastic substrates which require low processing temperatures. This composition comprises (1) a binder selected from the group of polyvinylpyrrolidone or copolymers of polyvinylpyrrolidone and (2) a source of mobile cations.

Figure 1:
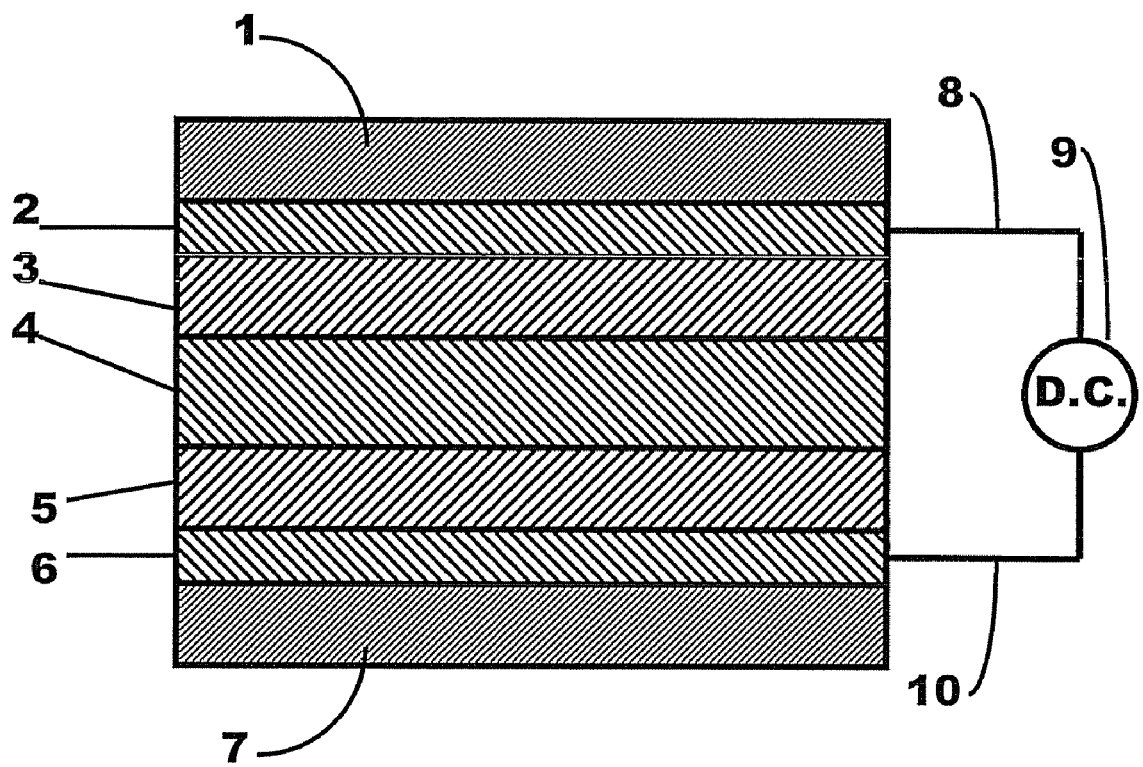
FIG. 1 is a cross-sectional view of the various layers of an embodiment of the present invention, the layers being deposited on polyethylene terephthalate film.

Referring now to FIG. 1, there is shown a flexible electrochromic device according to the present invention that includes transparent polyethylene terephthalate substrate 1 and transparent polyethylene terephthalate substrate 7. Onto polyethylene terephthalate substrate 1 is deposited electrically conductive layer 2 of indium tin oxide; onto transparent polyethylene terephthalate substrate 7 is deposited electrically conductive layer 6 of indium tin oxide. Polyethylene terephthalate coated with indium tin oxide is commercially available.

Electrochromic layer 3 comprising an electrochromic metal oxide is formed on layer 2 from an ethanolic solution using a coating process to be described below. It should be understood that this composition and coating process is not critical in the present invention, and that the electrochromic layer can be formed as desired.

Ion-storage layer 5 comprising a metal oxide or a perfluorosulfonated anionic polyelectrolyte is formed on layer 6 from an ethanolic solution using a coating process to be described below. It should be understood that this composition and coating process is not critical in the present invention, and that the ion-storage layer can be formed as desired.

Ion-conducting layer 4 comprising (1) a binder selected from the group of polyvinylpyrrolidone or copolymers of vinylpyrrolidone and (2) a source of mobile cations is formed on layer 3 using a coating process to be described below, and laminated to layer 5. It should be understood that this coating process is not critical in the present invention and that the ion-conducting layer can be formed as desired.

From a direct current power supply 9, electrical connection 8 is made to indium tin oxide layer 2, and electrical connection 10 is made to indium tin oxide layer 6.

Figure 2:
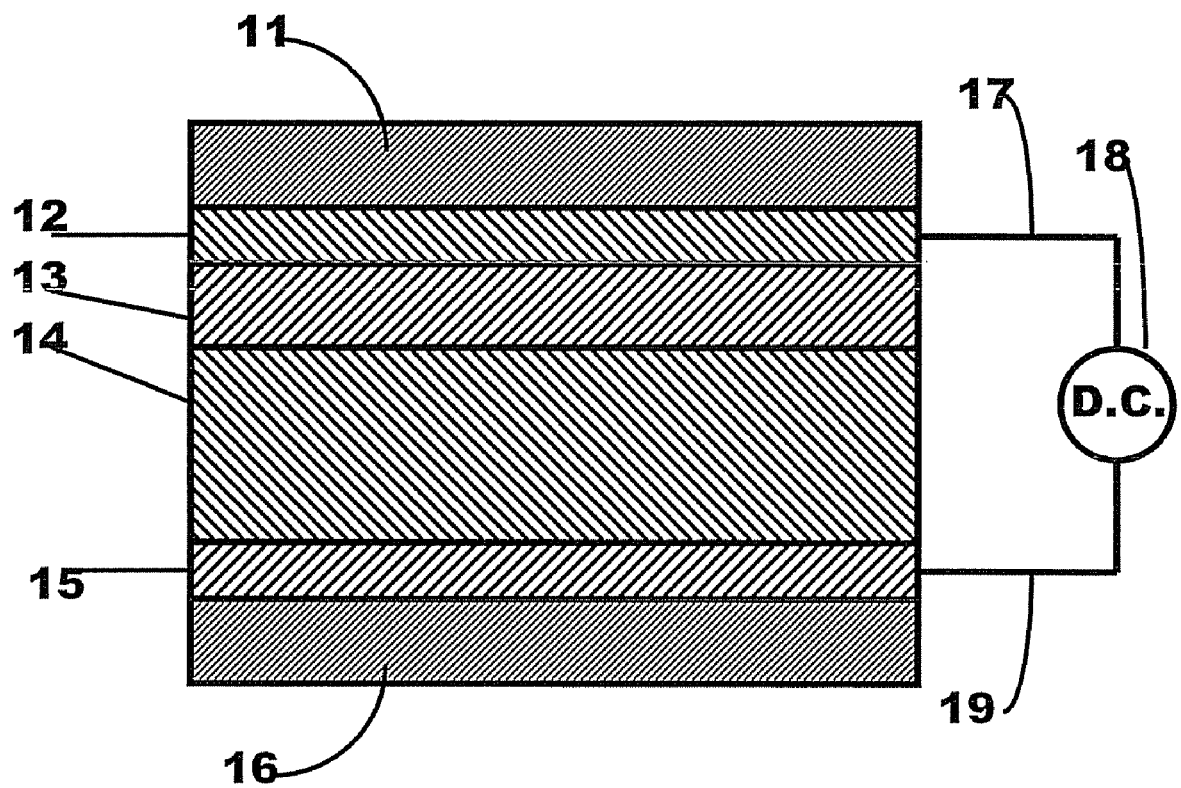
FIG. 2 is a cross-sectional view of the various layers of an embodiment of the present invention, the ion-storage layer being eliminated and the layers being deposited on polyethylene terephthalate film.

Referring now to FIG. 2, there is shown a flexible electrochromic device according to the present invention that includes transparent polyethylene terephthalate substrate 11 and transparent polyethylene terephthalate substrate 16. Onto polyethylene terephthalate substrate 11 is deposited electrically conductive layer 12 of indium tin oxide; onto transparent polyethylene terephthalate substrate 16 is deposited electrically conductive layer 15 of indium tin oxide. Polyethylene terephthalate coated with indium tin oxide is commercially available.

Electrochromic layer 13 comprising an electrochromic metal oxide is formed on layer 12 from an ethanolic solution using a coating process to be described below. It should be understood that this composition and coating process is not critical in the present invention, and that the electrochromic layer can be formed as desired.

Ion-conducting layer 14 comprising (1) a binder selected from the group of polyvinylpyrrolidone or copolymers vinylpyrrolidone and (2) a source of mobile cations is formed on layer 13 using a coating process to be described below, and laminated to layer 15. It should be understood that this coating process is not critical in the present invention and that the ion-conducting layer can be formed as desired.

From a direct current power supply 18, electrical connection 17 is made to indium tin oxide layer 12, and electrical connection 19 is made to indium tin oxide layer 15.

Figure 3:
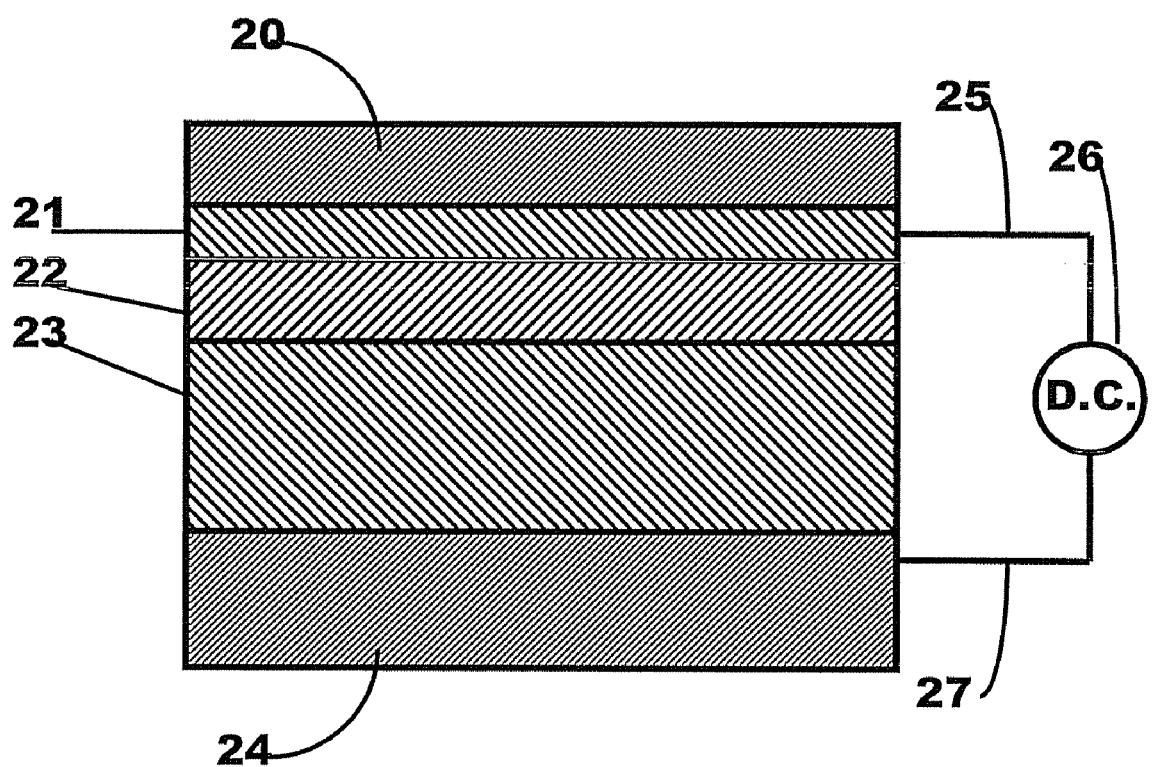
FIG. 3 is a cross-sectional view of the various layers of another embodiment of the present invention, incorporating stainless steel foil.

Referring now to FIG. 3, there is shown a flexible electrochromic device according to the present invention that includes transparent polyethylene terephthalate substrate 20 and flexible stainless steel substrate 24. Onto polyethylene terephthalate substrate 20 is deposited electrically conductive layer 21 of indium tin oxide. Polyethylene terephthalate coated with indium tin oxide is commercially available.

Electrochromic layer 22 comprising an electrochromic metal oxide is formed on layer 21 from an ethanolic solution using a coating process to be described below. It should be understood that this composition and coating process is not critical in the present invention, and that the electrochromic layer can be formed as desired.

Ion-conducting layer 23 comprising (1) a binder selected from the group of polyvinylpyrrolidone or copolymers of vinylpyrrolidone and (2) a source of mobile cations is formed on layer 22 using a coating process to be described below, and laminated to layer 24. It should be understood that this coating process is not critical in the present invention and that the ion-conducting layer can be formed as desired.

From a direct current power supply 26, electrical connection 25 is made to indium tin oxide layer 21, and electrical connection 27 is made to the stainless steel substrate 24.

The limitations of the prior art and the utility of this invention are illustrated by the following examples.

EXAMPLE 1

Example 1 demonstrates that an ion-conducting layer comprising methyl methacrylate will not function well as an adhesive in an electrochromic device with glass substrates. For this example, an electrochromic layer was prepared by the method of U.S. Pat. No. 6,456,418, incorporated by reference herein.

The electrochromic coating solution was prepared in the following manner: A 250 ml Erlenmeyer flask was equipped with a stirring bar and set in a room-temperature water bath on a magnetic stirrer. The apparatus was held in place by a ring stand and clamps. All subsequent operation took place behind a transparent safety shield to protect against eruptions. Into the Erlenmeyer flask was introduced about 40 g of reagent grade 30 wt. % aqueous hydrogen peroxide. The hydrogen peroxide was stirred and permitted to come to equilibrium with the water bath. Over the next 20 minutes, elemental tungsten powder of approximately 10μ particle size was added to the hydrogen peroxide. A vigorous reaction ensued, and within about 120 minutes the tungsten was digested. The flask was removed from the bath, and platinum gauze inserted in the solution to remove excess peroxide. The flask was covered and allowed to stand overnight with the gauze in place.

The following day, the gauze was removed, and to the beaker was added about 150 g of neat ethanol. After mixing, the solution was filtered through fluted filter paper into a glass bottle. Upon standing for one week, the solution changed from a translucent, slightly yellow solution to a deeper "straw" yellow. This solution was about 5 wt. % tungstic acid in essentially ethanol. In order to complete the formulation, a 5 wt. % solution of perfluorosulfonated anionic polyelectrolyte in alcohol, obtained from Aldrich Chemical of Milwaukee Wis. and described as a 5% solution of Nafion® resin, was used as received. About 14 g of the perfluorosulfonated anionic polyelectrolyte solution was mixed with about 21 grams of the tungstic acid solution to create the electrochromic coating solution.

The electrochromic layer was formed on a 25 mm×75 mm×1 mm soda-lime glass substrate (ITO/glass), coated on one side only with indium tin oxide. The substrate was knife-coated with the coating solution by the following method: Two strips of adhesive spacer tape, each of approximate dimension 75 mm long×2 mm width by 125μ thick were laid along each long edge of the substrate on the conductive side. A few drops of the coating solution were placed in the center of the conductive side of the substrate, and a razor blade riding on the surface of the spacer tape was used to draw a coating from the center to one edge. The coating was allowed to stand 10 minutes at room temperature, and then dried in an 115° C. oven for 15 minutes. The spacer tape was then removed, resulting in a 25 mm×75 mm substrate of which approximately a 25 mm×37.5 mm area was coated with an electrochromic layer approximately 1μ thick.

The ion-conducting layer coating solution was prepared in the following manner: Into 2 g of acetone (anhydrous) was dissolved 0.5 g of polymethylmethacrylate (MW 120,000), 0.5 g of propylene carbonate (anhydrous), and 0.05 g of LiClO$_4$ (reagent grade). It was then stirred to dissolve to a clear solution.

The ion-conducting layer was formed on the conductive side of a 25 mm×75 mm×1 mm soda-lime glass substrate (ITO/glass), coated on one side only with indium tin oxide. The substrate was knife-coated with the coating solution by the following method: Two strips of adhesive spacer tape, each of approximate dimension 75 mm long×2 mm width by 125 μl thick, were laid along each long edge of the substrate on the conductive side. A few drops of the coating solution were placed in the center of the conductive side of the substrate, and a razor blade riding on the surface of the spacer tape was used to draw a coating from the center to one edge. The coating was allowed to stand 10 minutes at room temperature, and then dried in a 115° C. oven for 15 minutes. The spacer tape was then removed, resulting in a 25 mm×75 mm substrate of which approximately a 25 mm×37.5 mm area was coated with an ion-conducting layer approximately 40μ thick.

The electrochromic coating was soaked briefly in 1M LiClO$_4$. in propylene carbonate to activate it. The electrochromic layer and the ion-conducting layer were laminated face-to-face with an overlap of approximately 25 mm×37.5 mm in a roll laminator set at 40° C. The uncoated parts of each substrate were opposite each other, resulting in a device approximately 25 mm×112.5 mm in size. The uncoated ITO on each substrate was striped with silver conductive paint in order to improve electrical contact for subsequent testing.

Electrical connection was made to each electrode through a double-pole, double-throw (DPDT) switch, so that a 3.0 volt potential could be applied to the electrodes, and the polarity reversed by means of the DPDT switch. Applying a voltage potential, then reversing the polarity with the DPDT switch, allowed visible detection of a reversible electrochromic effect. For example, upon making an electrochromic electrode the cathode, the electrochromic electrode would turn blue. Upon reversing the polarity and making an electrochromic electrode the anode, the electrochromic electrode would visibly clear. The device showed the expected darkening and clearing of the electrochromic layer. However, after the first cycle the device failed due to delamination resulting from inadequate adhesion.

EXAMPLE 2

Example 2 demonstrates that an ion-conducting layer comprising a perfluorosulfonated anionic polyelectrolyte will not function well as an adhesive in an electrochromic device with glass substrates. For this example, an electrochromic layer was prepared by the method described in Example 1

The ion-conducting-layer coating solution was a 5 wt. % solution of perfluorosulfonated anionic polyelectrolyte in alcohol, obtained from Aldrich Chemical and described as a 5% solution of Nafion® resin. The ion-conducting layer was formed on the conductive side of a 25 mm×75 mm×1 mm soda-lime glass substrate (ITO/glass) in the same way as Example 1, resulting in an ion-conducting layer approximately 6μ thick.

The electrochromic layer and the ion-conducting layer were soaked briefly in an aqueous 0.5N sulfuric in propylene carbonate to activate them. The device was then assembled as described in Example 1.

The device was tested as described in Example 1 with the application of 6 volts. The device showed the expected darkening and clearing of the electrochromic layer. However, after the first cycle the device failed due to delamination resulting from inadequate adhesion.

EXAMPLE 3

Example 3 demonstrates that an ion-conducting layer comprising a perfluorosulfonated anionic polyelectrolyte will not function well as an adhesive in an electrochromic device with plastic substrates.

For this example, (1) an electrochromic layer was prepared by the method described in Example 2 utilizing 75 mm×25 mm×2 mm polycarbonate substrates with conductive gold sputtered on one side, and (2) the ion-conducting layer was prepared by the method described in Example 2 utilizing 75 mm×25 mm×2 mm polycarbonate substrates with conductive gold sputtered on one side. The device was assembled as described in Example 2.

The device was tested as described in Example 1. The device showed the expected darkening and clearing of the electrochromic layer. However, after the first cycle the device failed due to delamination resulting from inadequate adhesion.

EXAMPLE 4

Example 4 illustrates the advantage of the present invention over the known art described in the previous examples. For this example, an electrochromic layer was prepared by the method of Example 1 on a 25 mm×75 mm×1 mm soda-lime glass substrate.

The ion-conducting layer coating solution was prepared in the following manner: Into 40 g of ethanol (anhydrous) was dissolved 5 g of poly 1-vinylpyrrolidone-co-vinyl acetate (50K MW; mole ratio VP:VA 1.3:1), 10 g of poly 1-vinylpyrrolidone-co-vinyl acetate (50 wt % in isopropyl alcohol, 13K MW; mole ratio VP:VA 1:2.4), 5 g of tetraethylene glycol and 3.6 g of $LiClO_4$. It was stirred to dissolve to a clear solution.

The ion-conducting layer was formed from a 25 mm×75 mm×1 mm soda-lime glass substrate (ITO/glass), coated on one side only with indium tin oxide, by the method described in Example 1, resulting in with ion-conducting layer approximately 30µ thick.

The electrochromic layer and the ion-conducting layer were laminated face-to-face with an overlap of approximately 25 mm×37.5 mm in a roll laminator set at 40° C. The uncoated parts of each substrate were opposite each other, resulting in a transparent device approximately 25 mm×112.5 mm in size. The uncoated ITO on each substrate was striped with silver conductive paint in order to improve electrical contact for subsequent testing. It was not necessary to soak the electrochromic layer or the ion-conducting layer to activate it.

The device was tested as described in Example 1. It cycled from blue to clear, and survived in excess of 25 cycles without failure. In a following example, a device surviving 5000 cycles on plastic substrates is described.

EXAMPLE 5

Example 5 illustrates the utility of the present invention with flexible substrates of indium tin oxide sputtered on polyethylene terephthalate (ITO/PET). For this example, the electrochromic coating solution was prepared by combining about 1 g of the perfluorosulfonated anionic polyelectrolyte solution with about 4 grams of the tungstic acid solution described in Example 1.

The electrochromic layer was coated onto a 75 mm×75 mm×0.2 mm ITO/PET substrate using an automatic sheet coater. The automatic coater was outfitted with a size 20 (twenty) rod, which provides a wet thickness of 50µ. The ITO/PET was clipped in place with the conductive side up and the coating bar lowered into place after assuring that it was fully returned to the start position. About 0.5 ml of ethanolic electrochromic coating solution was then slowly squirted at the interface of the center of the bar and the ITO/PET film with a disposable pipette. The solution wicked along the bar to both ends. The automatic sheet coater was turned on and the switch was moved from "Stop" to "Test", which advanced the bar along the coating surface. The switch was set back to "Stop" when the bar was about 75 mm beyond the end of the ITO/PET, i.e. the bar was allowed to travel about 75 mm on the glass coating surface. The bar was then lifted, and the switch set to "Return" to bring the bar back to the start position without scoring the newly-coated film. After about 2 minutes, the film was removed from the automatic sheet coater. The film was allowed to let stand horizontally on a paper towel for about 5 minutes, and then it was placed in an 115° C. oven for 20 minutes. The coated layer was transparent, and of approximate dimensions 62.5 mm×75 mm. The leading edge of the ITO/PET substrate was left uncoated to allow for electrical connection.

The ion-conducting layer coating solution described in Example 4 was utilized. Unlike previous examples, the ion-conducting layer was coated directly on the electrochromic layer. The electrochromic-coated sample was clipped onto the automatic sheet coater surface on the uncovered conductive border. The automatic sheet coater was outfitted with a size 40 (forty) rod, which provides a wet thickness of 100µ. The coating bar lowered into place after assuring that it was fully returned to the start position. Approximately 1 ml of ion-conducting layer coating solution was slowly squirted at the interface of the film at the bar. The automatic sheet coater was turned on and the switch was moved from "Stop" to "Test", which advanced the bar along the coating surface. The coating went from edge to edge. The switch was set back to "Stop" when the bar was about 75 mm beyond the end of the ITO/PET, i.e. the bar was allowed to travel about 75 mm on the glass coating surface.

The bar was then lifted, and the switch set to "Return" to bring the bar back to the start position without scoring the newly-coated film. After about 5 minutes, the film was removed from the automatic sheet coater. The film was allowed to stand horizontally on a paper towel for about 5 minutes, and then placed in an 115° C. oven for 20 minutes. The coated layers were transparent, and of approximate dimension 62.5 mm×75 mm×25µ thick. The leading edge of the ITO/PET substrate was left uncoated to allow for electrical connection.

The device was assembled in a 40° C. roll laminator. The coated film was laminated to the conductive side of an uncoated 75 mm×75 mm×0.2 mm ITO/PET substrate to create the structure described in FIG. 2. The films were offset slightly to create a device of final dimension 75 mm×100 mm. The uncoated ITO on each substrate was striped with silver conductive paint in order to improve electrical contact for subsequent testing. The laminated device was transparent.

The device was tested as described in Example 1. It cycled 25 times from dark blue to transparent without delamination.

The device was then cut in half from silver electrode to silver electrode with a razor blade. This demonstrated that no special edge sealing was required and that the device could be trimmed to size without delamination. One of the two halves of the device was subsequently attached to a Cypress Systems Model CS-2000 Computer Controlled Electroanalytical System and cycled 5000 times from −2.25V to +2.25V over a period of three weeks without adhesion failure or loss of color contrast from blue to transparent.

EXAMPLE 6

Example 6 illustrates the utility of the present invention with an electrochromic device comprising an ion-storage layer. The electrochromic layer was prepared as described in Example 5. The ion-conducting layer was prepared as described in Example 5. For this example, the ion-storage-layer coating solution was a 5 wt. % solution of perfluorosulfonated anionic polyelectrolyte in alcohol, obtained from Aldrich Chemical and described as a 5% solution of Nafion® resin. It was used as received. The ion-storage layer was coated onto a 75 mm×75 mm×0.2 mm ITO/PET substrate using an automatic sheet coater. The automatic sheet coater was outfitted with a size 20 (twenty) rod. The ITO/PET was clipped in place with the conductive side up and the coating bar lowered into place after assuring that it was fully returned to the start position. About 0.5 ml of coating solution was then slowly squirted at the interface of the center of the bar and the ITO/PET film with a disposable pipette. The solution wicked along the bar to both ends. The automatic sheet coater was turned on and the switch was moved from "Stop" to "Test", which advanced the bar along the coating surface. The switch was set back to "Stop" when the bar was about 75 mm beyond the end of the ITO/PET, i.e. the bar was allowed to travel about 75 mm on the glass coating surface.

The bar was then lifted, and the switch set to "Return" to bring the bar back to the start position without scoring the newly coated film. After about 2 minutes, the film was removed from the automatic sheet coater. The film was allowed to let stand horizontally on a paper towel for about 5 minutes, and then it was placed in an 115° C. oven for 20 minutes. The coated layer was transparent, and of approximate dimension 62.5 mm×75 mm×3µ thick. The leading edge of the ITO/PET substrate was left uncoated to allow for electrical connection.

The device was assembled in a 40° C. roll laminator. The coated electrochromic/ion-conducting layer was laminated to the coated ion-storage layer to create the structure described in FIG. 1. The substrates were offset slightly to create a device of final dimension 75 mm×100 mm. The uncoated ITO on each substrate was striped with silver conductive paint in order to improve electrical contact for subsequent testing. The laminated device was transparent. The device was tested as described in Example 1. It cycled 25 times from dark blue to transparent without delamination.

EXAMPLE 7

Example 7 illustrates the unexpected property of the ion-conducting layer to become tackier with the addition of LiClO$_4$, and also demonstrates that metal foil may be used as the flexible substrate. Four 75 mm×25 mm×0.2 mm ITO/PET substrates were coated with electrochromic layers as described in Example 5. Each substrate had an electrochromic layer of approximate size 62.5 mm×25 mm, and exposed ITO on one edge of approximate dimension 12.5 mm×25 mm.

A stock solution was prepared by combining 40 g of ethanol (anhydrous), 5 g of poly 1-vinylpyrrolidone-co-vinyl acetate (50K MW; mole ratio VP:VA 1.3:1), 10 g of poly 1-vinylpyrrolidone-co-vinyl acetate (50 wt % in isopropyl alcohol, 13K MW; mole ratio VP:VA 1:2.4), and 5 g of tetraethylene glycol. This stock solution was divided into four aliquots of 2 g each. Into the first aliquot was dissolved 0.09 g of LiClO$_4$. Into the second aliquot was dissolved 0.12 g of LiClO$_4$. Into the third aliquot was dissolved 0.18 g of LiClO$_4$. Into the fourth aliquot was dissolved 0.30 g of LiClO$_4$. For convenience, these solutions will subsequently be called 18% Li, 24% Li, 36% Li and 60% Li, respectively.

In turn, each electrochromic-coated substrate was clipped onto the automatic sheet coater surface on the uncovered conductive border. The first was coated with 18% Li solution, the second with 24% Li solution, the third with 36% Li solution, and the fourth with 60% Li solution, all by the method of Example 5. Each coating was transparent and of approximate dimension 62.5 mm×25 mm×25µ.

The ion-conducting layer coated from the 18% Li solution was slightly tacky. The ion-conducting layer coated from the 24% Li solution was about the same. The ion-conducting layer coated from the 36% Li solution was significantly tackier, and the ion-conducting layer coated from the 60% Li solution was "gooey," almost liquid. All coatings were transparent, with no precipitation or separation of components.

Four devices were assembled in a 40° C. roll laminator. The coated ITO/PET substrates were laminated to 75 mm×75 mm×0.2 mm stainless steel substrates to create the structure described in FIG. 3. The substrates were offset slightly to create a device of final dimension 75 mm×100 mm. The uncoated ITO on each ITO/PET substrate was striped with silver conductive paint in order to improve electrical contact for subsequent testing. The laminated device was opaque due to the stainless steel.

Each device was tested as described in Example 1. The electrochromic layers of each device cycled 5 times from dark blue to transparent without delamination.

EXAMPLE 8

Example 8 demonstrates that an ion-conducting layer may be fabricated solely from polymer and alkali salt, without the addition of plasticizers, fillers, or oligomers. Example 8 also demonstrates that water may be used as a coating solvent. A 75 mm×25 mm×0.2 mm ITO/PET substrate was coated with an electrochromic layer as described in Example 7.

An ion-conducting-layer coating solution was prepared by combining 15 g of distilled water, 5 g of poly 1-vinylpyrrolidone-co-vinyl acetate (50K MW; mole ratio VP:VA 1.3:1), and 1.2 g of LiClO$_4$. The solution was transparent.

The electrochromic-coated substrate was coated with an ion-conducting layer by the method of Example 7, with the exception that a size 60 coating bar, which provides a wet thickness of 150µ, was employed. The result was a transparent coating of approximate dimension 62.5 mm×25 mm×50µ. The coated ITO/PET substrate was laminated to a stainless steel substrate by the method of Example 7. The device was tested as described in Example 1. The electrochromic layer cycled 5 times from blue to transparent without delamination.

EXAMPLE 9

Example 9 demonstrates that polycarbonate may comprise the flexible substrate. One 75 mm×25 mm×0.2 mm ITO/PET substrate was coated with electrochromic layer as described in Example 5. The substrate had an electrochromic layer of approximate size 62.5 mm×25 mm, and exposed ITO on one edge of approximate dimension 12.5 mm×25 mm.

The 18% Li stock solution was used to coat the ion-conducting layer by the method of Example 7. The coating was transparent and of approximate dimension 62.5 mm×25 mm×25µ.

The electrochromic device was assembled in a 40° C. roll laminator. The coated ITO/PET substrate was laminated to 75 mm×25 mm×2 mm polycarbonate substrates with conductive gold sputtered on one side. The substrates were offset slightly to create a device of final dimension 75 mm×100 mm. The uncoated conductor on each substrate was striped with silver conductive paint in order to improve electrical contact for subsequent testing. The laminated device was transparent.

The device was tested as described in Example 1. The electrochromic layer of the device cycled 5 times from dark blue to transparent without delamination.

While this invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A flexible electrochromic device comprising:
   (a) a flexible substrate with at least one electrically conductive surface;
   (b) an electrochromic layer in contact with the at least one electrically conductive surface; and
   (c) an adhesive ion-conducting layer in contact with the electrochromic layer, said adhesive ion-conducting layer including (1) a polymer binder selected from the group consisting of polyvinylpyrrolidone and copolymers of vinylpyrrolidone, and (2) a source of cations,
   wherein said device is capable of being deformed and returned to flatness in an undamaged state.

2. The flexible electrochromic device as recited in claim 1, wherein said polymer binder is poly 1-vinylpyrrolidone-co-vinyl acetate.

3. The flexible electrochromic device as recited in claim 1, wherein the source of cations is selected from the group consisting of alkali metal salts, acids, polyelectrolytes and polyacids.

4. The flexible electrochromic device as recited in claim 3, wherein the source of cations is $LiClO_4$.

5. The flexible electrochromic device as recited in claim 1, wherein the flexible substrate is metal.

6. The flexible electrochromic device as recited in claim 5, wherein the metal is selected from the group consisting of stainless steel, steel, nickel, aluminum, iron, copper, gold, silver, platinum, palladium, indium, tin, and chromium.

7. The flexible electrochromic device as recited in claim 1, wherein the flexible substrate is plastic.

8. The flexible substrate as recited in claim 7, wherein the plastic is deposited on at least one side with an electrically conductive layer.

9. The flexible electrochromic device as recited in claim 8, wherein at least one electrically conductive layer is patterned.

10. The flexible electrochromic device as recited in claim 1, wherein the flexible substrate is polyethylene terephthalate.

11. The flexible electrochromic device as recited in claim 10, wherein the polyethylene terephthalate is deposited on at least one side with an electrically conductive layer.

12. The flexible electrochromic device as recited in claim 10, wherein the polyethylene terephthalate is deposited on at least one side with indium tin oxide.

13. The flexible electrochromic device as recited in claim 1, wherein the flexible substrate is fabric.

14. The flexible electrochromic device as recited in claim 1, wherein the flexible substrate is polycarbonate.

* * * * *